2,868,759

COMPOSITION COMPRISING METALLIC SHOT AND SYNTHETIC RESINOUS BINDER

Xavier Béchu, Chambéry, France, assignor to l'Aluminium Français, Paris, France, a corporation of France No Drawing. Application January 4, 1955
Serial No. 479,845

Claims priority, application France January 14, 1954

2 Claims. (Cl. 260—41)

The present invention relates to a novel composite product containing essentially a particulate metal and a bonding means, such as a plastic material, a resin or an adhesive, the latter including those having a protein base, such as fish and casein glues. The term "particulate" metal used in the present specification and claims is used in a broad sense, and denotes metal in the form of granules, pellets, beads, flakes, platelets, chips, shavings, powder, pieces of wire, filaments, fibers, or other discrete units.

Very finely divided metals, especially bronzes and aluminum, are used in the paint industry, but the proportion of metallic pigment used relative to the resin is small and does not, generally, exceed a few percent by weight. As a result, the mechanical properties of the layers formed upon drying of these paints are determined for the most part by the nature of the resins contained therein.

In contrast, the present invention has for its object a product in which the metal contributes largely in determining the properties of the product by imparting thereto remarkable and unforeseen qualities. The novel composite product contains the metal in a less finely divided state than that in which comminuted metals are generally used, as for example, in paints.

In accordance witth the present invention, the plastic materials, resins, or adhesives which form part of the composition of the novel product are chosen from among those which adhere to the metal used in the form of grains, wires, chips, shavings, leaf, or other divided forms. When the metal exhibits suitable mechanical characteristics as in the case, for example, of bronzes, zinc or aluminum and alloys of the latter, the composite product possesses remarkable strength and high resistance to wear.

The product of the present invention can contain, in addition to the metal and the bonding material, auxiliary substances such as softening agents, e. g. solvents and/or plasticizers, coloring materials, and powdered, fibrous or flaky fillers. Materials such as polystyrene, polyvinyl chloride or acetate, resins such as acrylic, methacrylic, urea-formaldehyde, phenolformaldehyde, polyesters, polyamides, protein plastics and adhesives having an epoxy resin or other base, are advantageously used, according to the invention, in an intimate mixture with the metal in particulate form, the mixture being molded or else laminated by passage between rolls. Not only do the resultant masses possess considerable resistance to wear but, in addition, their resistance to impact, tension and compression are very high. Hence, the invention produces masses of desired shape, the mechanical properties of which approach those of metals, whereas their thermal, electrical and acoustical properties remain sufficiently similar to those of the plastic material, so that they can serve as suitable thermal, electrical and acoustical insulators.

As a result of this combination of properties, the composite products of the present invention possess great advantages in numerous industrial applications. Thus, they are very suitable for use as roofing, flooring, road markings (white lines, cross-walk stripes, etc.), all types of sealing joints for metallic and other parts, as well as for a large number of various articles.

To prepare a composite product in accordance with the invention, the metallic powder can be mixed with a solution of the bonding material in a suitable solvent, and the latter is subsequently evaporated. Further, the particulate metal can be incorporated in the bonding material while the latter is in a molten state. Another procedure consists in mixing the particulate metal with the bonding material, the latter being in a powdered state. In order to obtain a homogeneous mass, it is desirable that the bonding material be in a jellied condition at the time when it is mixed with the metal. The mixture obtained, according to one of these procedures, is molded at a suitable pressure, or else is laminated between rolls at a temperature at which the plastic or the resin used is normally worked.

The particulate metal can also be mixed with a liquid starting material which is susceptible of being transformed into a plastic, resin, or adhesive by the action of a catalyst; in that event, the catalyst is added to the mixture of the particulate metal with the liquid starting material, and the mass is permitted to harden in a mold.

A modification of the invention consists in increasing to an extreme extent the proportion of the metal, e. g. in excess of 95% and up to 99%, so as to have present only that amount of bonding material which is just sufficient to glue together by point contacts the adjacent metallic grains (particles). In this manner, there is obtained in lieu of an impervious mass, a porous product which can be used as a filter.

According to a special feature of the invention, the composite product can possess qualities which are superior to those of the resin contained therein, if the metal be used in such a state of comminution that at least a half of the metal is present in the form of particles, the smallest dimension of which exceeds 0.07 mm. It is preferable that this dimension exceed 0.14 mm.

Since the metal may be present in the form of fragments (particles) such as grains, wires, leaves or chips having different dimensions, it is desirable that the proportion of those particles the smallest dimension of which is less than 0.14 mm., be less than 50% of the total quantity of metal used. Thus, when the metal used is in the form of shot, it is preferred, according to the invention, that this shot contain at least 50% pellets (grains) which are retained on a 100 mesh screen. If the metal be employed in the form of wire or filaments, it is desirable that at least half of these filaments have a thickness greater than 0.14 mm.

Whereas the upper limit of the smallest dimension of the particles used does not have to be rigorously fixed, it does not generally exceed 10 mm. in the practical application of the present invention. It is frequently less than 5 mm. When metallic granules are used, the best results are obtained by using granules the smallest dimension of which ranges between 0.14 and 3 mm. and preferably, between 0.3 and 1.5 mm. Further, it is recommended to use mixtures of grains of various sizes, so as to obtain good filling of the voids.

As regards the largest dimension of the metallic particles used in the process of the invention, it does not generally exceed 10 mm. except in the case where the metal is in the form of wires or filaments; the latter may have a length of several centimeters.

According to another feature of the invention, the mechanical properties—especially resistance to impact—of the plastic or resinous materials are improved when the proportion of the particulate metal ranges between 10% and 70% by volume.

In the case of light alloys, highly desirable results are obtained when the proportion, by volume, of these metals ranges between 20 and 60% of the composite product. Thus, it is possible to obtain increases in resistance to impact of the plastic material—which may exceed 300%—by the addition of aluminum or an aluminum alloy to these substances, whereas known products which contain less than 10%, or more than 70% by volume of particulate metal, are always more fragile than products formed of the corresponding bonding substance, e. g. plastic, alone.

The products of the present invention have also the advantage of possessing softening points (heat distortion temperatures) which are higher than those of the bonding, e. g. plastic, materials themselves used in the preparation of the product.

On the other hand, the improvement in the mechanical properties relative to those of the bonding, e. g. plastic, material used—an improvement which generally passes through an optimum corresponding to a definite proportion of metal and a definite granulometry (particle size distribution)—depends on the nature of the metal as well as on the nature of the bonding material used. For example, if the optimum mechanical resistance be obtained by mixing about 32% by volume aluminum shot with polystyrene, then, in the case of a polyvinyl chloride-acetate resin modified by maleic anhydride, the optimum will be obtained with about 60% by volume aluminum shot.

There are given below a number of typical examples to illustrate the invention, it being expressly understood that these are not given by way of limitation.

EXAMPLE 1

To 70 kg. of aluminum shot having a particle distribution ranging between 16 and 45 mesh, there are added 30 kg. of powdered vinyl chloride-acetate copolymer, sold under the name of Afcovyl M.5. The resultant mixture is compressed at a pressure of 150 kg./cm.² at 120° C. to form plates.

EXAMPLE 2

The mixture of Example 1 is well stirred while heated to 140° C. It is then laminated into strips 3 mm. thick and 100 mm. wide. These strips are cemented onto a road, replacing the central white lines which are ordinarily painted on; to this end, the strips are first dipped in acetone and then applied onto the hot bitumen of the road. The external surface, highly resistant to wear, becomes more and more shiny with use and lasts almost indefinitely, whereas the painted lines used up till now must be renewed very frequently.

Note: In the present specification, the proportions of the particulate metal are given as percentages by volume of the composite product; hence, these proportions hold whatever be the specific weight of the metal used.

EXAMPLE 3

Polystyrene in bead form is mixed with aluminum shot and the mixture is molded, by injection into a mold, to obtain two rods/bars having dimensions 127 x 12.7 x 5 mm. The molding conditions are so controlled as to obtain rods/bars without external shrinkage. The resultant bars are cut in two along their length, are notched by a cutting tool (according to ASTM Standard D256–47T), and are then tested to destruction in an Avery testing machine. The resistance to impact thus measured, expressed in kg./cm. per cm. notch, is set out in the following table for different proportions of shot in the composite products and for different shot sizes.

In this table, the proportions of shot are expressed as percentage by volume of the composite product; the sizes are defined by the limiting numbers of the mesh screens through which the grains used pass.

Table 1

| I | II | III | IV |
|---|---|---|---|
| Percent of shot by volume | Screen Mesh 16 to 45, kg. cm./cm. | Screen Mesh 45 to 140, kg. cm./cm. | Passing through screen mesh 100, kg. cm./cm. |
| 8.95 | | 4 | |
| 14.4 | 4.4 | 4.6 | 3.6 |
| 20.5 | 5 | 4.4 | |
| 24.3 | 6 | | |
| 28.2 | 6 | | 4 |
| 32.4 | 6.4 | 4 | |
| 37.1 | 6 | 3.8 | |
| 42.3 | 4.4 | | 3.6 |

In the case of polystyrene by itself, without shot, the resistance to impact determined under the same conditions, is 4 kg. cm./cm. notch. Hence, it is seen that by using suitably selected particle distribution and proportions, the surprising result is obtained that the resistance of the product is considerably improved. Indeed, column II of the annexed table (16 to 45 mesh screens) shows, that when the granules used are sufficiently large, and used in the proportion of 32.4% by volume, there is obtained a resistance to impact of 6.4 kg. cm./cm., in lieu of 4 for polystyrene used by itself; the resistance is thus increased by 1.6 times. Moreover, it is to be noted that the improvement in resistance is appreciable in the range of about 14% to 42% of shot, the optimum improvement occurring at about 32.4%.

Using shot passing 45 to 140 mesh screens and which contains 46% grains passing a 100 mesh screen, a certain improvement in the resistance to impact is shown for shot contents ranging between 10 and 25% by volume, but beyond these proportions, the resistance is lowered. (See column III of the table.)

The data given in the preceding table shows that when the shot does not contain grains of a size larger than 100 mesh screen (column IV), the resistance of the composite product is not as good as that produced of polystyrene alone. A polystyrene base product containing 32.4% by volume shot passing through screens ranging between 16 and 45 mesh, has a softening point of 6° C., which is higher than that of polystyrene alone (according to the heat-distortion test ASTM D638).

EXAMPLE 4

Rods analogous to those in Example 1, are prepared in the same manner with shot passing a 100 mesh screen which is used to the extent of 70% by volume of the composite product. The resistance to impact is less than 2 kg. cm./cm.

EXAMPLE 5

Rods were molded, as in Example 1, from a mixture formed of 67.6 parts by volume of polystyrene and 32.4 parts by volume of shot of four different particle distributions. The following resistances to impact were obtained.

Table 2

| Granulometry | | | Resistance to Impact, kg. cm./cm. |
|---|---|---|---|
| Percent of grains passing through screens of— | | | |
| 16 to 45 mesh | 45 to 100 mesh | 100 to 140 mesh | |
| 100 | 0 | 0 | 6.5 |
| 70 | 16.2 | 13.8 | 5.8 |
| 40 | 32.4 | 27.6 | 5.5 |
| 0 | 54 | 46 | 4.2 |

EXAMPLE 6

70 parts by weight (i. e. 53% by volume) of aluminum shot having the following particle distribution:

*Table 3*

24% passing through 16–25 mesh screens
36% passing through 25–45 mesh screens
11% passing through 45–100 mesh screens
9% passing through 100–140 mesh screens
6.4% passing through 140–200 mesh screens
13.6% passing through 200 mesh screen are mixed with 30 parts by weight of powdered phenol-formaldehyde resin ("Bakelite") and the resultant mixture is molded in the manner current for this thermosetting material. A mass is obtained the characteristics of which compare as follows with those of Bakelite of current manufacture.

*Table 4*

|  | The composite product with 53% by volume of aluminum grains | Bakelite with wood-flour filler | Bakelite with textile fibers filler |
|---|---|---|---|
| Impact strength, determined by smooth bars, kg. cm./cm | 17 | 6.5 | 7.5 |
| Impact strength, determined by notched bars, kg. cm./cm | 7 | 1.9 | 7.4 |
| Flexural strength, kg./cm.$^2$ | 1,300 | 850 | 700 |
| Tensile strength, kg./cm.$^2$ | 700 | 320 | 300 |

It will accordingly be seen that the composite product containing 53% by volume aluminum shot (70% by weight) and having a particle distribution such that 71% of the shot passes through screens of 16 to 100 mesh, possesses mechanical characteristics which are far superior to those of products having a Bakelite base, as usually produced.

EXAMPLE 7

A resin formed by the copolymerization of vinyl chloride-acetate and 2.5% maleic anhydride, stabilized by the addition of tribasic lead sulfate was dissolved in a solvent formed of one part of methyl-ethyl-ketone mixed with one part toluene. The resultant solution contains 100 gms. resin for 232 gms. solvent. With this solution, there are prepared three mixtures having varying proportions of shot, passing 16 to 45 mesh screens, of an aluminum alloy containing 4% copper and 1.2% magnesium. The mixtures, cast in plates 4 mm. thick, were dried at 80° C. and molded for 15 minutes at 140° C. Test pieces for resistance measurements were cut out from these plates. Test pieces were likewise prepared in the same manner, starting from the initial solution which, however, did not contain any shot. Furthermore, test pieces were also prepared directly from the initial resin without using a solvent. The following table shows the results obtained in measuring the resistance to tension and impact. Resistance to impact was determined by means of a Dynstat apparatus.

*Table 5*

| Proportion of shot, percent by volume of finished product | Tensile Strength, kg./cm.$^2$ | Resistance to Impact, g. cm./cm. |
|---|---|---|
| 0 |  | 50 |
| 17.6 | 390 | 110 |
| 33.4 |  | 130 |
| 61 | 560 | 220 |
| 0 (prepared without solvent) | 500 | 100 |

EXAMPLE 8

By proceeding in the same manner as in Example 5, there were prepared three products having a final composition of 33.4% by volume of aluminum alloy shot and 66.6% by volume of polyvinyl chloride-acetate containing 2.5% maleic anhydride. In these three products, the metal has different particle distribution. Resistance measurements gave the following results:

*Table 6*

| Granulometry | Tensile Strength, kg./cm.$^2$ | Resistance to Impact, gr. cm./cm. |
|---|---|---|
| screen 16–45 mesh | 460 | 130 |
| screen 45–140 mesh | 435 | 105 |
| passing through 145 mesh screen | 320 | 80 |

The term "metallic" as used in the present specification and the appended claims, denotes metals in uncombined state and alloys of such metals.

The mesh numbers referred to herein are those relating to screens of the Tyler system.

I claim:

1. A novel composition comprising, shot of a mesh size within the range of 16–45 of a metallic substance selected from the group consisting of bronzes, zinc, aluminum and alloys of aluminum, and a bonding material which adheres to the metallic substance and selected from the group consisting of polystyrene and polyvinyl chloride-acetate; said metallic substance constituting about 20% to about 40% by volume of the composition when polystyrene is the bonding agent, and 20% to about 61% when polyvinyl chloride-acetate is the bonding agent, the said metallic substance and bonding material being intimately commingled into a homogeneous mixture.

2. A novel composition consisting of aluminum shot and a bonding material therefor constituted of polystyrene, the aluminum shot constituting about 20% to about 40% by volume of the composition and being characterized in that it consists of units of a mesh size within the range of 16–45, the said aluminum shot and polystyrene being intimately commingled into a homogeneous mixture.

References Cited in the file of this patent

UNITED STATES PATENTS

| 2,570,649 | Davidoff | Oct. 9, 1951 |
| 2,716,190 | Baker | Aug. 23, 1955 |

FOREIGN PATENTS

| 519,298 | Great Britain | Mar. 21, 1940 |
| 626,983 | Great Britain | July 25, 1949 |

OTHER REFERENCES

Schmidt and Marlies: "Principles of High-Polymer Theory and Practice," 1st edition, 1948, pages 351–356.